United States Patent [19]

Bechtold

[11] 4,430,394

[45] Feb. 7, 1984

[54] SEPARATOR FOR STORAGE BATTERY

[75] Inventor: Dieter Bechtold, Frankfurt am Main, Fed. Rep. of Germany

[73] Assignee: Varta Batterie Aktiengesellschaft, Hanover, Fed. Rep. of Germany

[21] Appl. No.: 344,819

[22] Filed: Feb. 1, 1982

[30] Foreign Application Priority Data

Mar. 5, 1981 [DE] Fed. Rep. of Germany ....... 3108241

[51] Int. Cl.³ ............................................ H01M 2/16
[52] U.S. Cl. .................................... 429/147; 429/254
[58] Field of Search .............. 429/147, 146, 254, 247, 429/143, 142

[56] References Cited

U.S. PATENT DOCUMENTS

| 4,000,352 | 12/1976 | Hallenbeck et al. | 429/147 |
| 4,055,711 | 10/1977 | Ikari | 429/146 X |
| 4,091,183 | 5/1978 | Niggl | 429/143 X |
| 4,228,225 | 10/1980 | O'Rell | 429/147 |
| 4,368,243 | 1/1983 | O'Rell | 429/147 |

Primary Examiner—Charles F. Lefevour
Attorney, Agent, or Firm—Weiser & Stapler

[57] ABSTRACT

In the electrolyte space between the positive and negative electrode plates of a storage battery, there are inserted separators made of a porous plate which has pyramid-shaped protrusions and depressions formed on both sides. The protrusions, distributed in a grid-like pattern, abut with their tips against the electrode plates and provide accurate plate spacing. Between the protrusions, the separator provides pass-like passages which form channels extending along the separator surface, for the removal of gases from the electrolyte space.

12 Claims, 6 Drawing Figures

A–B

C–D

FIG. 2a
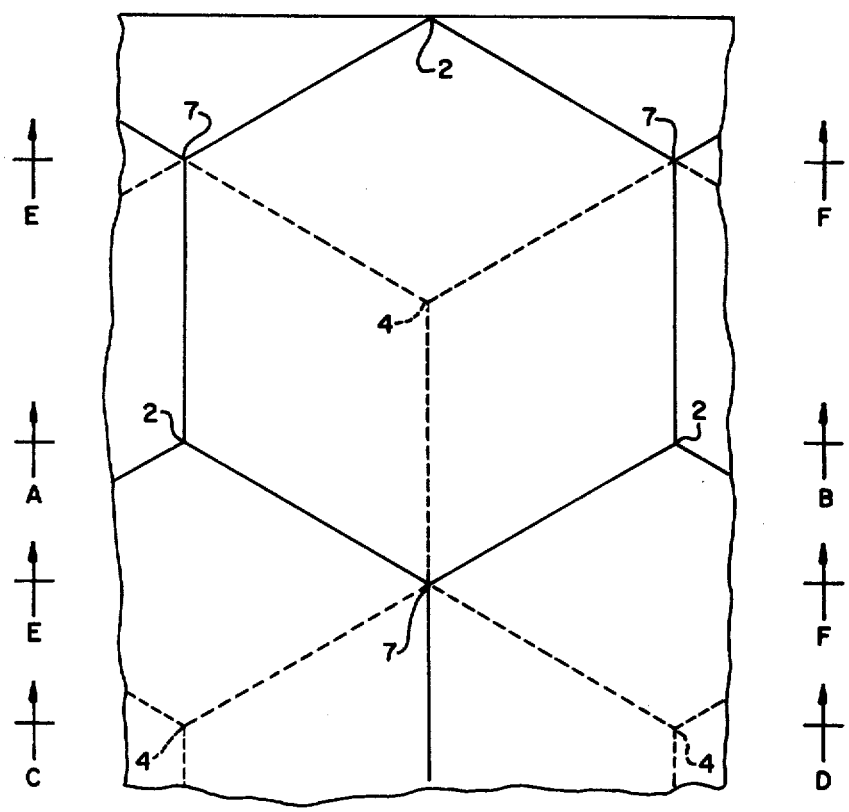
FIG. 2b
A-B
FIG. 2c
C-D
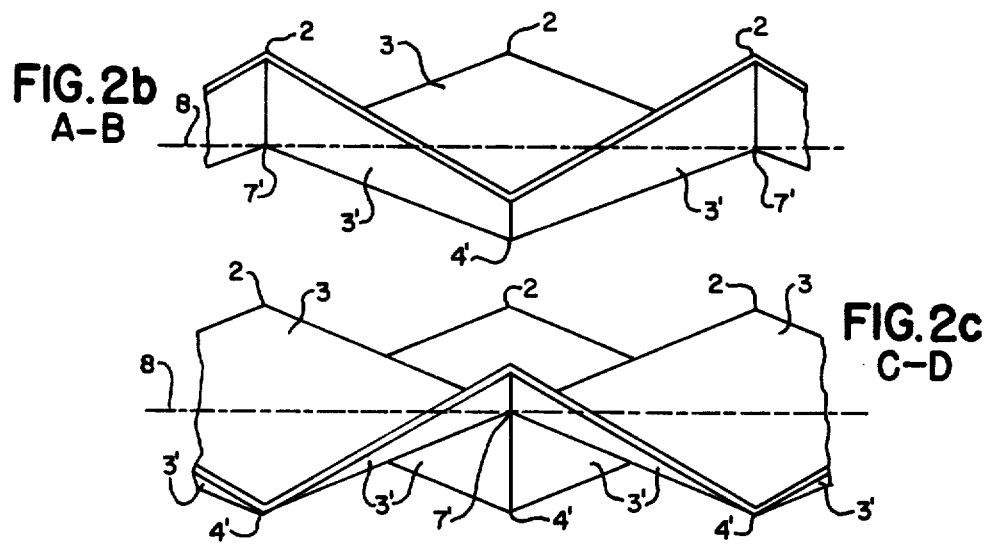

SEPARATOR FOR STORAGE BATTERY

The invention relates to a separator for storage batteries, and particularly lead storage batteries, in the form of a porous plate with protrusions, and which provides channels extending along the front and rear surface for gas removal along the plate surface.

Battery separators are intended, on the one hand, to prevent electrical contact between the negative and positive plates of a battery cell. On the other hand, they are also intended to provide a specific plate spacing between the plates. The required plate spacing is determined by the desired acid quantity between the plates, which in turn significantly influences the discharge capacity, particularly in the high-current region.

From German patent publication (Offenlegungsschrift) No. 3,022,406 there is known a battery separator in the form of a porous plate, which has projections on one side of the plate, all the projecting walls being continuously open toward the top in the contact region with the battery plate. The battery separator is formed from a small-pore, thin, thermoplastic strip by a rolling process. The roller system may consist, for example, of an engraved steel roller, which has to be preheated and an opposing roller of rubber.

In such a known battery separator, there is the disadvantage of channel-like gas removal, which does not permit gas exchange between adjacent channels. This can lead to interference with gas removal, particularly when there are formed deposits of active material. Moreover, the plastic material must be warmed in an auxiliary oven before it is subjected to the actual rolling process.

Accordingly, it is an object of the present invention to provide a separator which has, on both sides, a multiplicity of gas removal paths and which, by virtue of its deformation structure, makes possible an optimum plate spacing. In particular, there is to be used in the processing strip-like material having high ion permeability, without requiring separate heating of the strip prior to rolling.

These and other objects which will appear are achieved by providing the plate with protrusions and depressions pressed in on both sides, the protrusions extending in both directions from a central plane.

In a preferred embodiment, the protrusions have inclined surfaces which combine to form a three-sided pyramid. Moreover, the protrusions and depressions are provided in the form of a grid-like pattern which is uniformly distributed over the surface. The protrusions on one side are spaced from each other with a given periodicity. The protrusions simultaneously form the depressions on the opposite side.

For further details, reference is made to the discussion which follows and to the accompanying drawings wherein:

FIG. 1a shows a front elevation view of the separator;

FIGS. 1b and 1c respectively show cross-sections taken along sections A-B and C-D in FIG. 1a;

FIGS. 2a shows an enlarged elevation view of one grid element of FIG. 1a; and

FIGS. 2b and 2c show cross-sections of the enlarged portion of FIG. 2a taken along section lines A-B and C-D, respectively.

Figure 1A:
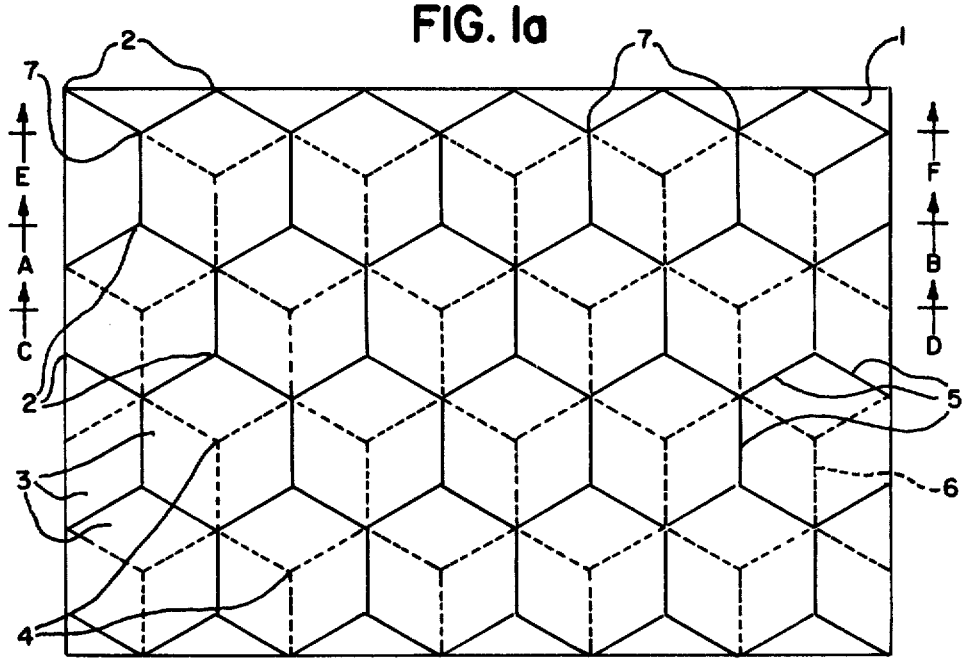

Referring now to FIG. 1a, the peaks of the pyramid-shaped protrusions from the plane of separator plate 1 are designated for convenient identification by reference numerals 2. These protrusions 2 constitute the intersections of three obliquely positioned surfaces 3, which intersect the virtual central plane of the plate, and also define pyramid-shaped recesses on the opposite side.

For better identification, the edges 6 of pyramid surfaces 3 which lead into recess 4 are shown in dashed lines, whereas the upwardly extending edges 5 of the protrusion are shown in solid lines. Between any three peaks, the intersection of the upwardly extending edges 5 define a pass-like passage 7 in the central plane for gas removal. Whereas the protrusions 2 of the upper surface simultaneously define the recesses of the lower surface, and conversely the recesses 4 of the upper surface define the protrusions of the lower surface, the intersection points 7 of the upper surface are at the same locations as the intersection points of the lower surface.

Figure 1B:
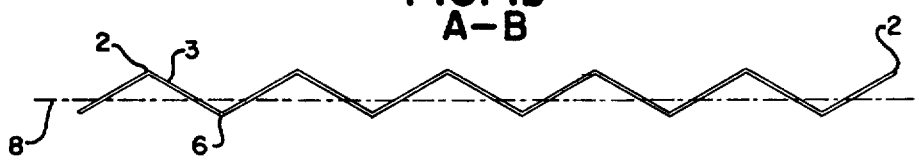

By virtue of the grid structure, some of the peaks 2 are located at the top rim of the plate, whereas the intersection points 7 with the central plane of the plate are located at the bottom rim of the plate. The cross-section taken along line A-B in FIG. 1a, and shown in FIG. 1b, shows those peaks 2 which are located above the virtual central plane 8. Between the peaks, there are the edges 6 which are defined by oblique surfaces 3, and which lead in groove-like manner into the depression. At the section line, these edges 6 are already below the virtual plane 8 of the plate. An intersection of the deformed separator material with the plane 8 of the plate is represented by line E-F in FIG. 1a.

Figure 1C:
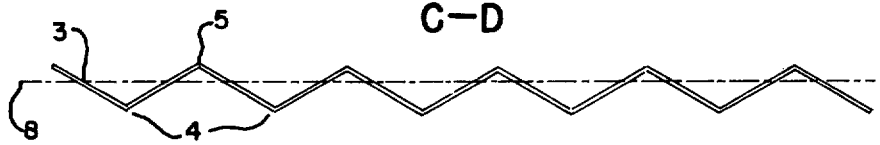

FIG. 1c shows the section along line C-D in FIG. 1a. This figure shows a cross-section through the recesses 4 and the lateral surfaces 3. The protrusions lying above the plate center line represent a section through the edges 5.

FIG. 2a represents separately one grid element of FIG. 1a. In FIG. 2b, the two pyramid peaks 2 are sectioned along line A-B in FIG. 2a. In the upper middle portion of the figure, there can also be seen the peak 2 lying at the top plate rim. Those surfaces which are visible from above, are designated by reference numeral 3, whereas those surfaces which are visible only from below are designated by reference numeral 3'. The other reference numerals are correspondingly primed, to the extent that the underside is visible. In FIG. 2b, the lateral walls are visible, whose intersection defines the recess 4'. From above, there can be seen the lateral wall 3, whereas from below there can be seen the two lateral walls 3'. At the central plane, which is represented in FIG. 2a by line E-F, there are visible the pass-like gas passage points 7. The points 7 on the upper and lower sides are at the same location, whereas the deformation which appears from above as recess 4, appears from below as a protrusion. The height of the pyramid peaks is 1.4 mm, measured from recess 4'. Hereafter, this will be referred to as the deformation depth. The distance between adjoining peaks is between 5 and 6 mm, whereas the spacing along line A-B between the two peaks 2 lying along that line amounts to about 10 mm. Viewed from above, the angles of edges 5 and 6 relative to the top plate rim are +30°, −30° and 90°.

FIG. 2c shows the section along line C-D in FIG. 2a. FIG. 2c shows in its left and right portions, the cross-section of the two recesses 4'. These are at the lower edge of lateral surface 3 which, at its upper edge, forms the peak of pyramid 2. The lateral surface 3 intersects at line 8 the central plane of the separator plate. The other two lateral surfaces 3', which similarly define recess 4', are visible from beneath. From the gas passage point 7' which lies along section line 8, the intersecting edge of the two slanting surfaces 3' extends to the recess 4', shown in the middle of the figure. Further, there is visible in the middle of the figure, the protrusion 2 located at the top plate rim. The angles between the lateral surfaces and the horizontal plane respectively form an angle between 110° and 130°. Preferably, this angle is 120°.

There is used a microporous, thermoplastic synthetic material (synthetic polyolefin pulp), i.e. a material of synthetic fibers resembling cellulose. This material, which is referred to as a synthetic cellular plastic, is made in the form of strip material. The thickness of the plate is in the range of 0.05 to 1 mm; preferably a thickness of about 0.2 mm is used. The pores are relatively small and generally have a diameter of 0.01 to 100, μm.

The deformation preferably takes place by means of a self-engraving calendering machine, using a combination of a steel and a paper roller. This produces a double-sided deformation in a single passage. In this deforming roller set, a paper roller consisting of paper discs, which are axially compressed and cylindrically shaped, are forced against an engraved steel roller under high pressure, and then caused to rotate, with accompanying moistening of the paper roller if appropriate, and heating of the steel roller to about 80° C. Over several hours of operation, the engraving on the steel roller is matingly transferred to the paper roller. For this, exact tangential synchronization between the roller surfaces is necessary. Subject to this requirement, an integral, multiple diameter relationship between the two rollers can be used. After the paper roller has been formed, the material which is to be deformed is passed between the roller pair, under reduced pressure, but without a gap between the rollers. A suitable operating temperature for the steel roller is from room temperature up to 140° C. The linear processing rate of the strip material may be up to 200 m/min.

When the deformation depth is 1.4 mm, and the separator is loaded with the maximum plate block weight of about 6.4 g/cm$^2$ encountered in starter batteries, no flattening of the overall height of the separator is observed. It is therefore possible to provide the desired plate spacing of about 1.4 mm. Also, loading with a block weight of about 50 g/cm$^2$, which frequently occurs in industrial lead batteries, does not cause any substantial flattening. After unloading, the full height is again measured. The electrical resistance is in the range of 70 to 200 mΩ.cm$^2$, and is preferably less than 100 mΩ.cm$^2$.

If an increase in separator thickness is desired, this can readily be achieved by super-position and subsequent connection of two separator plates. However, to prevent mutual nesting of the protrusions and recesses of the two components, the separator plates must be rotated relative to each other by a predetermined angle. Thus, two separator layers, rotated with respect to each other by 90°, and each having a deformation depth of 1.4 mm, make it possible to provide a thickness of 2.6–2.7 mm. Under the weight of the plate block, this thickness is compressed to about 2.3 mm. This is a separator thickness which is common for industrial batteries. The electrical resistance of this double composite separator is under 200 mΩ.cm$^2$. By rotation of the superposed separator plates through an angle which departs from 90°, still other separator thicknesses of the double plate can be obtained. That is because their geometry causes similar grid elements to penetrate into each other to a greater or lesser depth. In practice, such separators consisting of plural plates are welded together at the plate edges by ultrasonics. However, it is also possible to use heat welding, or joining by adhesives. Using other deformation depths and multiple superposed separator sheets, e.g. with three sheets, lesser and greater overall heights are obtainable.

Equally desirable separators can also be obtained using deformation configurations with protrusions in the form of truncated pyramids in lieu of pointed pyramids.

The essential advantages of the invention reside in that, through two-sided deformation of a relatively inexpensive material, there is provided a plate grid formation on both sides of the separator, which creates a plurality of open passages for gas removal along the separator surface.

Due to the two-sided deformation, it is further possible to construct a double, or multiple layer separator, whose separating space is filled by the deformation configurations.

I claim:

1. A separator for storage batteries, and particularly lead storage batteries, in the form of a porous plate provided with protrusions and having channels extending along both the front and the rear side for gas removal along the plate surface, the plate being provided with protrusions and recesses on both sides, the protrusions extending substantially symmetrically in both directions perpendicularly from a virtual central plane, the protrusions on both sides being all of similar shape and being distributed over the surface in a uniform grid-like pattern, the protrusions on one side being displaced from each other in accordance with a fixed periodicity, and the protrusions on one side forming the recesses on the other side of the plate, the protrusions having oblique faces which collectively define a pyramid.

2. The separator of claim 1 wherein
the pyramids have oblique faces which form a slant angle of between 110° and 130° with the horizontal.

3. The separator of claim 2 wherein the protrusions are three-sided pyramids.

4. The separator of claim 3 wherein the spacing between tips in the protrusions on opposite sides is between 0.5 and 3 mm.

5. The separator of claim 3 wherein the tips of adjacent protrusions are spaced by 4 to 6 mm from each other.

6. The separator of claim 3 wherein
the lateral faces of the protrusions are of rhomboid shape, at whose upper corner there is the tip of a particular protrusion, and at whose lower corner there is a recess, and the two lateral corners of the rhomboid are positioned at the virtual central plane of the plate, and respectively define a pass-like passage locus for gas traversal.

7. The separator of claim 3 wherein the protrusions on at least one side of the separator have the shape of a truncated pyramid.

8. The separator of claim 3 which comprises at least two layers with the same grid pattern, said layers being rotated relative to each other, placed on top of each other, and connected to each other.

9. The separator of claim 8 wherein the layers are rotated by substantially 90° relative to each other.

10. The separator of claim 1 wherein the thickness of the plate is between 0.05 and 1 mm.

11. The separator of claim 1 which consists of thermoplastic, synthetic material.

12. The separator of claim 11 wherein the material is cellular plastic.

* * * * *